(12) United States Patent
Steinrueck et al.

(10) Patent No.: US 8,978,632 B2
(45) Date of Patent: Mar. 17, 2015

(54) ION SENSING METHOD FOR CAPACITIVE DISCHARGE IGNITION

(75) Inventors: Peter Steinrueck, Hallstatt (AT);
Gerhard Ranegger, Gleinstätten (AT);
Joseph M. Lepley, Girard, OH (US);
Steven B. Pirko, Lake Milton, OH (US)

(73) Assignee: Hoerbiger Kompressortechnik Holding GmbH, Vienna (AT)

( * ) Notice: Subject to any disclaimer, the term of this patent is extended or adjusted under 35 U.S.C. 154(b) by 579 days.

(21) Appl. No.: 13/247,282

(22) Filed: Sep. 28, 2011

(65) Prior Publication Data

US 2013/0076362 A1 Mar. 28, 2013

(51) Int. Cl.
| | | |
|---|---|---|
| F02P 17/00 | (2006.01) | |
| F02P 3/06 | (2006.01) | |
| F02D 35/02 | (2006.01) | |
| F02P 17/12 | (2006.01) | |
| G01L 23/22 | (2006.01) | |
| F02P 3/08 | (2006.01) | |
| F02P 15/08 | (2006.01) | |

(52) U.S. Cl.
CPC ............ F02D 35/021 (2013.01); *F02P 3/0846* (2013.01); *F02P 15/08* (2013.01); F02P 17/12 (2013.01); G01L 23/221 (2013.01); *F02P 2017/128* (2013.01)
USPC ............................ 123/595; 324/378; 324/382

(58) Field of Classification Search
CPC  F02D 35/021; F02P 2017/128; F02P 3/0846; F02P 17/12; F02P 15/08; F02P 3/0838; G01L 23/221

See application file for complete search history.

(56) References Cited

U.S. PATENT DOCUMENTS

| | | | | |
|---|---|---|---|---|
| 4,781,166 | A * | 11/1988 | Remmers ....................... | 123/597 |
| 5,513,620 | A * | 5/1996 | Pyko et al. ..................... | 123/609 |
| 6,118,276 | A | 9/2000 | Nakata et al. | |
| 6,498,490 | B2 | 12/2002 | Karau et al. | |
| 6,557,537 | B2 | 5/2003 | Ikeda et al. | |
| 6,653,840 | B2 * | 11/2003 | Yorita et al. ................... | 324/380 |
| 6,734,677 | B2 * | 5/2004 | Toriyama et al. ............. | 324/399 |
| 6,937,024 | B2 | 8/2005 | Kim | |
| 7,121,270 | B1 * | 10/2006 | Plotnikov ....................... | 123/604 |
| 7,401,603 | B1 | 7/2008 | Lepley | |
| 7,404,396 | B2 * | 7/2008 | Toriyama et al. ............. | 123/598 |
| 2002/0066444 | A1 * | 6/2002 | Ikeda et al. .................... | 123/606 |
| 2005/0093549 | A1 * | 5/2005 | Kim ............................... | 324/380 |

FOREIGN PATENT DOCUMENTS

| | | |
|---|---|---|
| EP | 0183879 A1 | 6/1986 |
| EP | 0420599 B1 | 6/1995 |

\* cited by examiner

*Primary Examiner* — Arleen M Vazquez
*Assistant Examiner* — Hoang X Nguyen
(74) *Attorney, Agent, or Firm* — Dykema Gossett PLLC

(57) ABSTRACT

A method of ion sensing in a CD ignition system for an internal combustion engine comprises: a) closing the controllable switch in synchronism with the internal combustion engine for a period of time to transfer energy to the ignition coil primary to cause a spark breakdown across the spark plug; and b) observing the current in the secondary winding circuit indicative of ionization in the vicinity of the spark plug electrodes.

10 Claims, 2 Drawing Sheets

ION SENSING METHOD FOR CAPACITIVE DISCHARGE IGNITION

BACKGROUND OF THE INVENTION

1. Field of the Invention

This invention relates to a method of ion sensing for capacitive discharge ignitions for internal combustion engines and, in one embodiment, using pulse width modulation for biasing the secondary winding circuit during the sensing period.

2. Description of Related Art

Ion sensing or, more accurately ionization current sensing, is a technique for determining conditions within the cylinder of an internal combustion engine including, for example, misfire, knocking, and peak pressure. Misfire is the failure of the ignition to ignite the air/fuel mixture near the end of the compression stroke resulting in loss of power. Knocking is vibrations created in the cylinder, often the result of early ignition during the compression stroke. Peak pressure is the greatest pressure in the cylinder which optimally occurs near the top of the compression stroke. Ion sensing enables the correction or adjustment of the ignition to improve performance of the internal combustion engine.

Electrical current flows between the center and ground electrode of a spark plug when the air/fuel mixture has become ionized. During sparking for ignition the ionization is the result of the intense electric field across the electrodes. However, ionization also results from the chemical reactions taking place at the flame front as it propagates through the cylinder. To detect flame front ions, an electrical potential must be maintained across the spark plug electrodes during periods other that sparking. Current flowing in the secondary winding circuit of the ignition transformer or coil is indicative of the ionization at the spark plug.

Ion sensing has been implemented in inductive interrupt ignitions systems. As is well understood in the art, in such ignition systems, current flowing in the primary winding of the ignition transformer is interrupted based on a sensed position of the cam shaft to induce a high voltage in the secondary winding of the ignition transformer which is in series with the electrodes of the spark plug. To provide a bias for ion sensing it is necessary to include diodes and capacitor in the secondary winding circuit as taught, for example, in U.S. Pat. Nos. 6,118,276 and 6,498,490. In such systems there can be little if any adjustment of the biasing voltage which is stored during the initial sparking. Inductive interrupt ignitions systems are typically used with automotive engines.

Capacitive discharge (CD) ignition systems store energy on a storage capacitor building a voltage across the capacitor. A switch in series with the capacitor and the primary winding of the ignition transformer is closed based on a sensed position of the cam shaft to initiate sparking by inducing a large voltage in the secondary winding which is in series with the electrodes of the spark plug. It is known to open and close the switch during the compression stroke to create a train of pulses to the primary winding timed to reinforce the ringing action of the ignition transformer as taught in U.S. Pat. No. 7,401,603.

It is an advantage according to this invention to provide a method of ion sensing in a capacitive discharge (CD) ignition system. No circuit element must be added to the secondary winding circuit to maintain a bias across the spark plug electrodes. Moreover, bias voltage can be instantaneously adjusted providing real time spark ignition and/or secondary current control. No capacitor or diode need be added to the secondary winding circuit.

It is another advantage according to one embodiment of this invention that, in contrast to the other methods of ion sensing which work only in a time window clearly separated from the spark phase, in the method according to this invention, the change in ionization caused by the onset of combustion in the spark plug gap throughout the spark phase itself can be used to determine the start of ignition. The increased flow of current through the secondary winding in addition to the normal spark current is due to the decreased impedance of the ionized gases between the electrodes brought about by onset of combustion.

SUMMARY OF THE INVENTION

Briefly, according to this invention, there is provided a method of ion sensing in a CD ignition system for an internal combustion engine having a storage capacitor for being connected to a power supply in series with the capacitor, an ignition transformer having primary and secondary windings, and a controllable switch in series with the storage capacitor and the primary winding of the ignition transformer, an electronic circuit for controlling the controllable switch, and a spark plug having electrodes in series with the secondary winding of the ignition transformer.

In one embodiment, the method comprises the steps of:

a) initially closing the controllable switch in synchronism with the internal combustion engine for a period of time to transfer energy to the ignition coil primary to cause a spark breakdown across the spark plug;

b) subsequent to the initial period of closing, repeatedly opening and closing the switch setting or adjusting the ratio of the opening and closing periods to achieve a desired bias voltage across the spark plug electrodes; and c) observing the current in the secondary winding circuit indicative of ionization in the vicinity of the spark plug electrodes.

In another embodiment, the method comprises the steps of:

a) initially closing the controllable switch in synchronism with the internal combustion engine for a period of time to transfer energy to the ignition coil primary to cause a spark breakdown across the spark plug; and b) observing the current in the secondary winding circuit indicative of ionization in the vicinity of the spark plug electrodes.

BRIEF DESCRIPTION OF THE DRAWINGS

Further features and other objects and advantages will become clear from the following description made with reference to the drawings in which.

DESCRIPTION OF THE PREFERRED EMBODIMENTS

Figure 1:
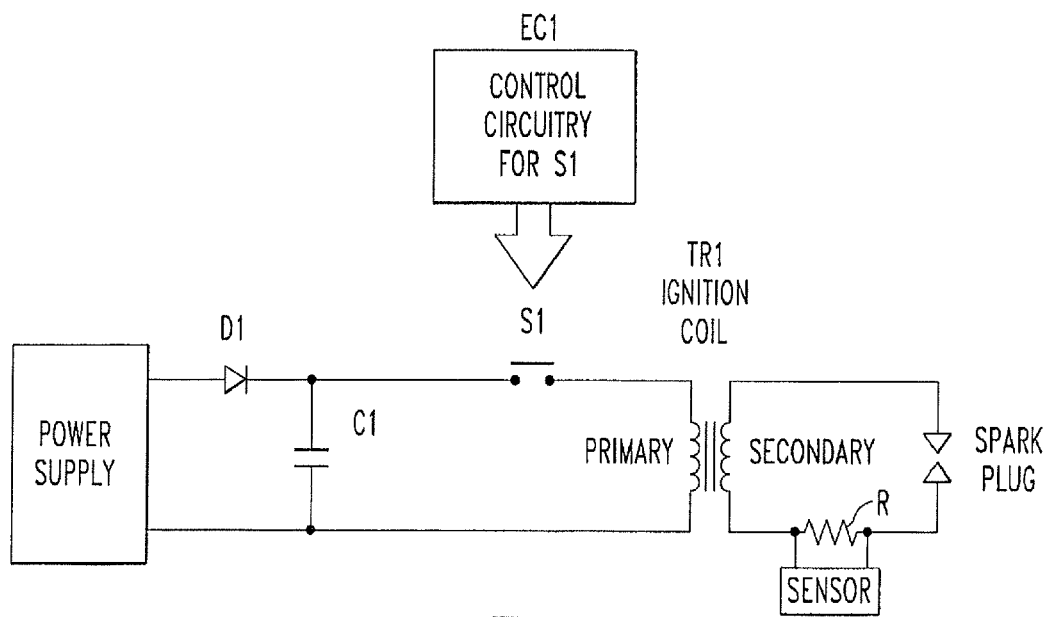
FIG. 1 is a schematic diagram of a typical capacitive discharge ignition system.

Referring now to FIG. 1, there is shown a basic capacitive discharge circuit for a high tension ignition system, substantially as described in U.S. Pat. No. 7,401,603, which comprises a storage capacitor (C1), a diode (D1), and power supply connected in series. An ignition transformer (TR1) has primary and secondary windings. The primary winding is in series with the storage capacitor and a controllable switch (S1). A spark plug is connected in series with the secondary winding of the ignition transformer. An electronic control circuit (EC1) drives the controllable switch.

The electronic control circuit is operated in synchronism with the engine and controls the open (conducting) and closed (non-conducting) periods of the switch such that the switch (S1) is initially closed for a period of time (T1) to transfer energy in pulses to the ignition coil primary; the switch (S1) is then opened for a second period of time (T2). Pulse duration and spacing is determined by the control circuit. A sense resistor (R) may be provided in series with the spark plug electrodes or another alternative means of current sensing, such as a Hall Effect device or a current measuring transformer may be used instead of the resistor to sense the secondary current.

The electronic control circuit may comprise a programmable microcontroller with input ports for sensing one or more positions relative to the rotation of the crank shaft, such as top dead center of the first cylinder, an input for sensing the current and/or voltage in the secondary circuit of at least one ignition transformer, and outputs for opening and closing one or more controllable switches.

As disclosed herein, a method of ion sensing using the above described CD circuit comprises:

a) initially closing the controllable switch in synchronism with the internal combustion engine for a period of time to transfer energy to the ignition coil primary to cause a spark breakdown across the spark plug;

b) subsequent to the initial period of closing, repeatedly opening and closing the switch setting or adjusting the ratio of the opening and closing periods to achieve a desired bias voltage across the spark plug electrodes; and c) observing the current. in the secondary winding circuit indicative of ionization in the vicinity of the spark plug electrodes during steps a) and/or b) described above.

Figure 2:
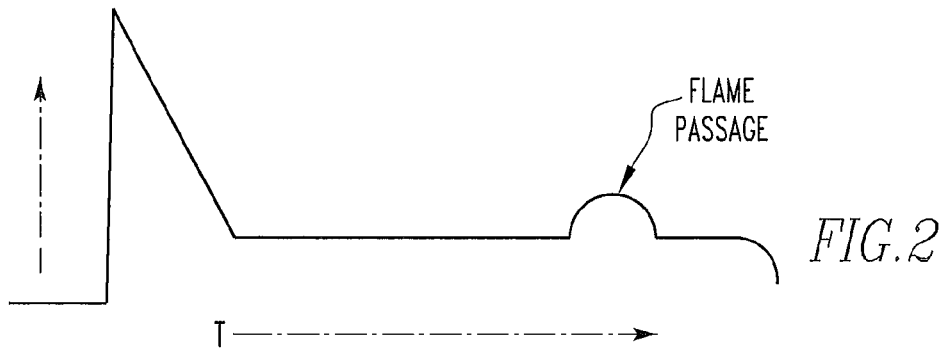
FIG. 2 is a schematic waveform diagram of a secondary current illustrating one embodiment of this invention.

Referring to FIG. 2, according to one embodiment of this invention, after the initial closing period of the controllable switch to cause a spark breakdown, a low voltage bias is maintained across the spark plug electrodes by controlling the ratio of opening and closing periods for a time sufficient to detect passage of the flame front between the spark plug electrodes. Preferably after the initial closing period of the controllable switch to cause a spark, the ratio of opening and closing periods is controlled to provide a constant low voltage across the spark plug. Flame passage is sensed by a rise in current in the secondary circuit.

Figure 3:
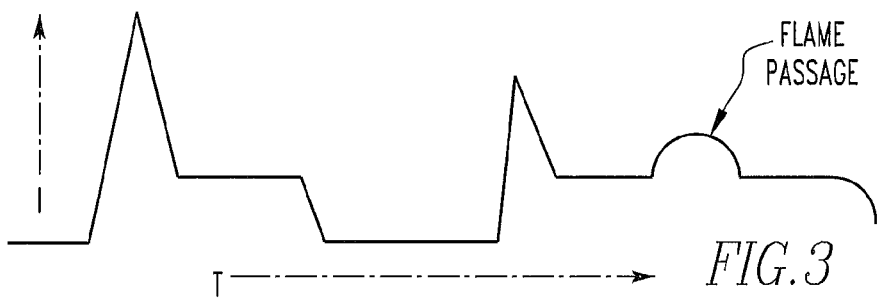
FIG. 3 is a schematic waveform diagram of a secondary current illustrating another embodiment of this invention.

Referring to FIG. 3, according to a second embodiment of this invention, after the initial closing period of the controllable switch to cause a spark breakdown and a period of time closing the controllable switch to implement a second spark breakdown, then maintaining a low voltage bias across the spark plug electrodes by controlling the ratio of opening and closing periods for a time sufficient to detect passage of the flame front between the spark plug electrodes.

Figure 4:
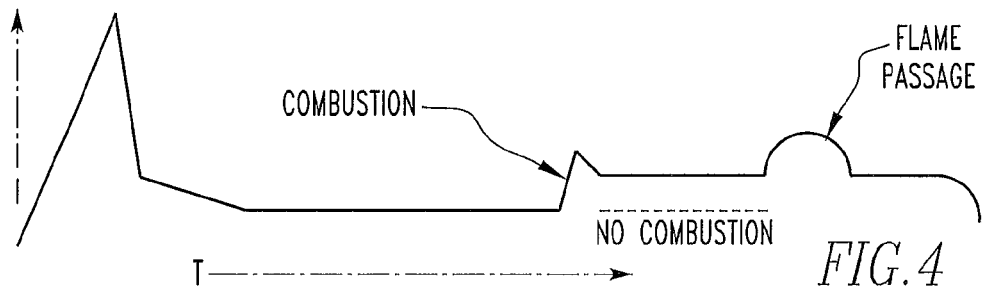
FIG. 4 is a schematic waveform diagram of a secondary current illustrating yet another embodiment of this invention.

Referring to FIG. 4, according to a third embodiment of this invention, after the initial closing period of the controllable switch to cause a spark breakdown, a low voltage bias across the spark plug electrodes is maintained by controlling the ratio of opening and closing periods to cause a second spark breakdown only if the initial spark breakdown caused continuous combustion of the air/fuel mixture and then maintaining a low voltage bias across the spark plug electrodes by controlling the ratio of opening and closing periods for a time sufficient to detect passage of the flame front between the spark plug electrodes.

According to a fourth embodiment of the invention, the total secondary current (spark plus ion current) which is established after the spark breakdown event is maintained at a virtually constant value for a fixed time long enough for the ion current to be sensed, by controlling the ratio of the opening and closing periods of the primary switch. The total current consisting of the spark current plus the ion current would normally decline rapidly after the spark breakdown thus forming a waveform which is triangular in shape. By forcing the total current value to be held to a constant value, the total current waveform will be rectangular in shape for the fixed constant current time period. In this embodiment, the higher the ion current present during this period of time, the less energy the primary drive circuit will need to provide to maintain this constant value of total current. The ratio of the opening and closing periods of the primary switch can then be used to determine the relative ion concentration between the electrodes of the spark plug occurring during the individual spark events by measuring this ON/OFF ratio of the switch controller.

According to a fifth embodiment of the invention, the total secondary current (spark plus ion current) which is established after the spark breakdown event is allowed to fall to a very low value and then maintained at a virtually constant value for a fixed time long enough for the ion current to be sensed, by controlling the ratio of the opening and closing periods of the primary switch. The total current consisting of the spark current plus the ion current would normally decline rapidly after the spark breakdown, thus forming a waveform which is triangular in shape. By forcing the ion current value to be held to a constant value, the ion current waveform will be rectangular in shape, fixed during the constant current time period and occur after the triangular waveform of the declining spark current. In this embodiment, the higher the ion current present during this period of time, the less energy the primary drive circuit will need to provide to maintain this constant value of ion current. The ratio of the opening and closing periods of the primary switch can then be used to determine the relative ion concentration between the electrodes of the spark plug after the individual spark events by measuring this ON/OFF ratio of the switch controller.

Figure 5:
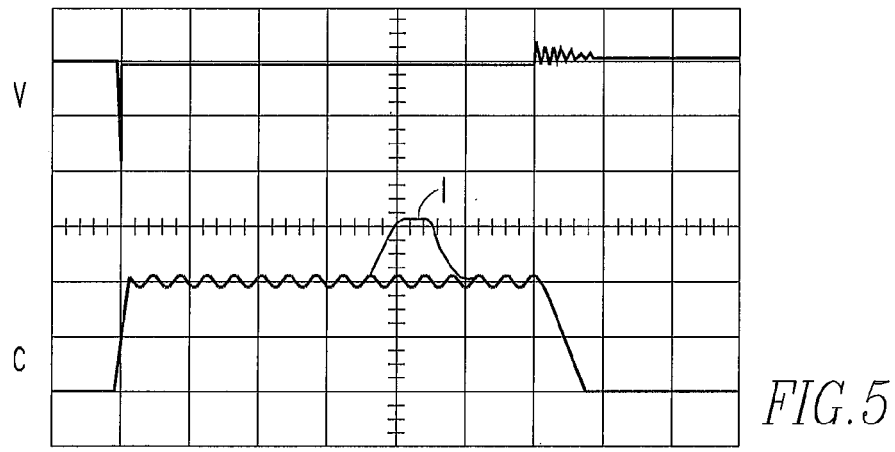
FIG. 5 is a schematic waveform diagram of a secondary current illustrating yet another embodiment of this invention.

Referring now to FIG. 5, in a sixth embodiment applicable to an engine with cylinders having sufficiently small bore size, the reflected ionization wave front takes place during the spark phase itself, and the energy provided by the initial closing of the switch to discharge the storage capacitor will provide sufficient bias for detecting the increased current flow due to the ionization caused by the onset of combustion. In FIG. 5, the top trace is voltage across the secondary winding and the bottom trace is current in the secondary winding. As schematically illustrated in FIG. 5, the increased current is detected by an abrupt increase in current I during the sparking period.

Having thus defined our invention in the detail and particularity required by the patent laws what is desired protected by Letters Patent is set forth in the following clams.

The invention claimed is:

1. A method of ion sensing in a capacitive discharge ignition system for an internal combustion engine having a storage capacitor for being connected to a power supply in series with the storage capacitor, an ignition transformer having primary and second windings, and a controllable switch in series with the storage capacitor and the primary winding of the ignition transformer, an electronic circuit for controlling the controllable switch, a spark plug having electrodes in series with the secondary winding of the ignition transformer, the method comprising the steps of:

a) initially closing the controllable switch in synchronism with the internal combustion engine for a period of time to transfer energy to the primary winding to cause a spark breakdown across the spark plug;

b) subsequent to the initial closing, repeatedly opening and closing the controllable switch to set or adjust a ratio of opening and closing periods to achieve a desired bias voltage across the spark plug electrodes that causes a continuously positive or continuously negative current flow in a secondary winding circuit; and c) observing the current flow in the secondary winding circuit, the current flow indicative of ionization in a vicinity of the spark plug electrodes during a period when the bias voltage is present across the spark plug electrodes and the current flow is present in the secondary winding circuit, wherein ionization in the vicinity of the spark plug electrodes is observed by an increase of the current flow in the secondary winding circuit.

2. The method according to claim 1, wherein the current in the secondary winding circuit is sensed as a voltage across a sense resistor in series with the spark plug electrodes.

3. The method according to claim 1, wherein the current in the secondary winding circuit is sensed as an output of a Hall Effect sensor coupled to the secondary winding.

4. The method according to claim 1, wherein after the initial closing period of the controllable switch to cause a spark breakdown, the bias voltage is maintained across the spark plug electrodes by controlling the ratio of opening and closing periods for a time sufficient to detect passage of a flame front between the spark plug electrodes.

5. The method according to claim 1, wherein the bias voltage includes a relatively low voltage that almost causes a second spark breakdown.

6. The method according to claim 1, wherein after the initial closing period of the controllable switch to cause a spark breakdown and a period of time closing the controllable switch to implement a second spark breakdown, then the virtually constant voltage bias is maintained across the spark plug electrodes by controlling the ratio of opening and closing periods for a time sufficient to detect passage of a flame front between the spark plug electrodes.

7. The method according to claim 1, wherein a secondary winding circuit current waveform corresponds to a spark current and an ion current and includes a rectangular waveform.

8. The method according to claim 1, wherein after the initial closing period of the controllable switch to cause a spark breakdown, maintaining the bias voltage across the spark plug electrodes by controlling the ratio of opening and closing periods to cause a second spark breakdown only if the initial spark breakdown caused continuous combustion of the air/fuel mixture, and then maintaining the bias voltage across the spark plug electrodes by controlling the ratio of opening and closing periods for a time sufficient to detect passage of the flame front between the spark plug electrodes.

9. The method of claim 1, wherein after the initial closing period of the controllable switch to cause a spark breakdown, a total secondary current consisting of a spark current plus an ion current is held at a constant value and a measurement of energy required to hold the total secondary current at the constant value is used as a relative inversely proportional measurement of an ion concentration between the electrodes of the spark plug during the spark breakdown.

10. The method of claim 1, wherein after the initial closing period of the controllable switch to cause the spark breakdown, the current of the secondary winding circuit is allowed to fall to a very low value and then maintained at a constant value and an energy required to maintain the current of the secondary winding circuit at the very low value is used as a relative inversely proportional measurement of an ion concentration between the electrodes of the spark plug after the spark breakdown.

* * * * *